United States Patent [19]

Renzetti

[11] 4,169,562
[45] Oct. 2, 1979

[54] FLY TYING DEVICE

[76] Inventor: Andrew Renzetti, R.D. No. 4, Coatsville, Pa. 19320

[21] Appl. No.: 901,176

[22] Filed: Apr. 28, 1978

[51] Int. Cl.² .................. A01K 97/00; B65H 81/00
[52] U.S. Cl. .............................. 242/7.01; 43/1; 269/97
[58] Field of Search ............. 57/11, 10; 242/7.01; 43/1; 269/97, 236

[56] References Cited

U.S. PATENT DOCUMENTS

| 2,236,781 | 4/1941 | Pannier | 43/1 |
| 2,486,142 | 10/1949 | Fong | 43/1 X |
| 2,586,636 | 2/1952 | Fischer et al. | 269/97 X |

FOREIGN PATENT DOCUMENTS

| 937263 | 3/1948 | France | 43/1 |
| 603464 | 6/1948 | United Kingdom | 43/1 |

Primary Examiner—Billy S. Taylor
Attorney, Agent, or Firm—Caesar, Rivise, Bernstein & Cohen Ltd.

[57] ABSTRACT

A device for tying fish flies onto the shank of a fishing hook. The device includes a rotatable shaft and a one-way clutch for rotating the shaft about the longitudinal axis of the shaft and for holding the shaft at any rotational position. Clamping means, including a pair of jaws, are mounted on the end of the shaft at a compound angle to the axis of the shaft. The clamping means includes a pair of jaws which terminate immediately adjacent to the axis so that when the hook is held in the jaws its shank is coaxial with the axis of the shaft and fully exposed. The shaft and clutch are mounted on a beam, whose height is adjustable. A clamp base secures the device to a table or other surface. A thread cradle is mounted on the beam and a spring clip for holding fly making components is mounted on the shaft.

8 Claims, 9 Drawing Figures

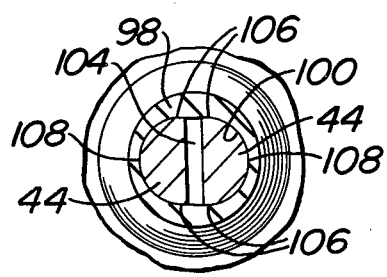
FIG. 3
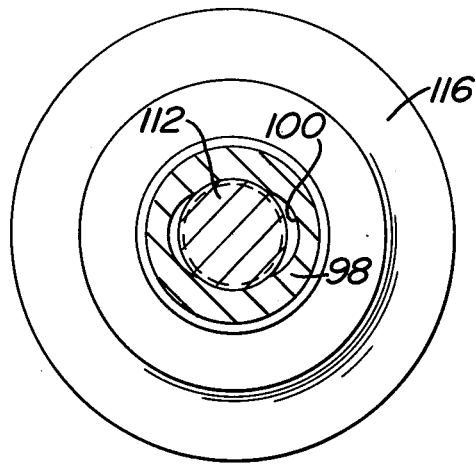
FIG. 4
FIG. 5
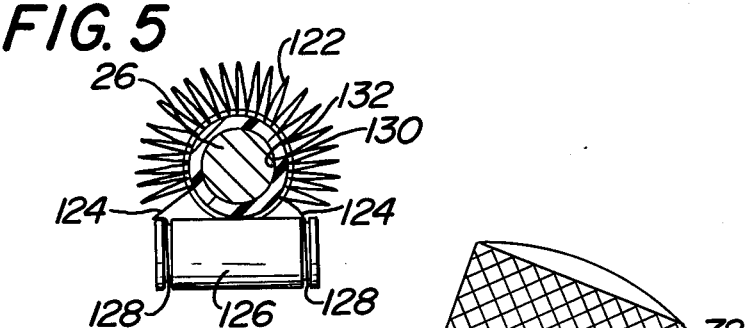
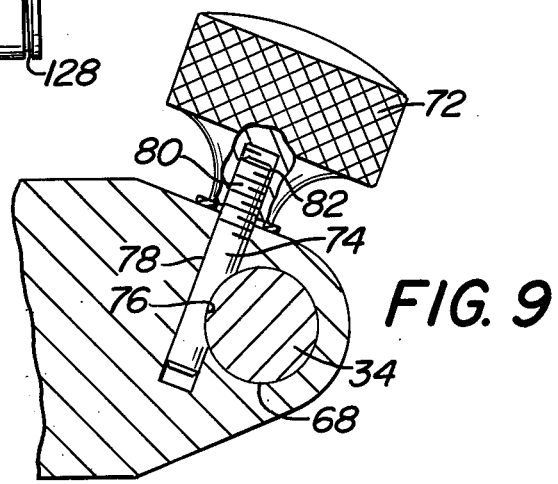
FIG. 9

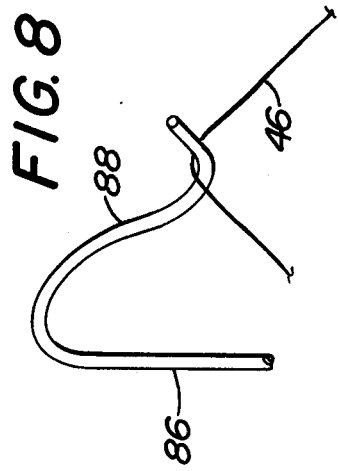
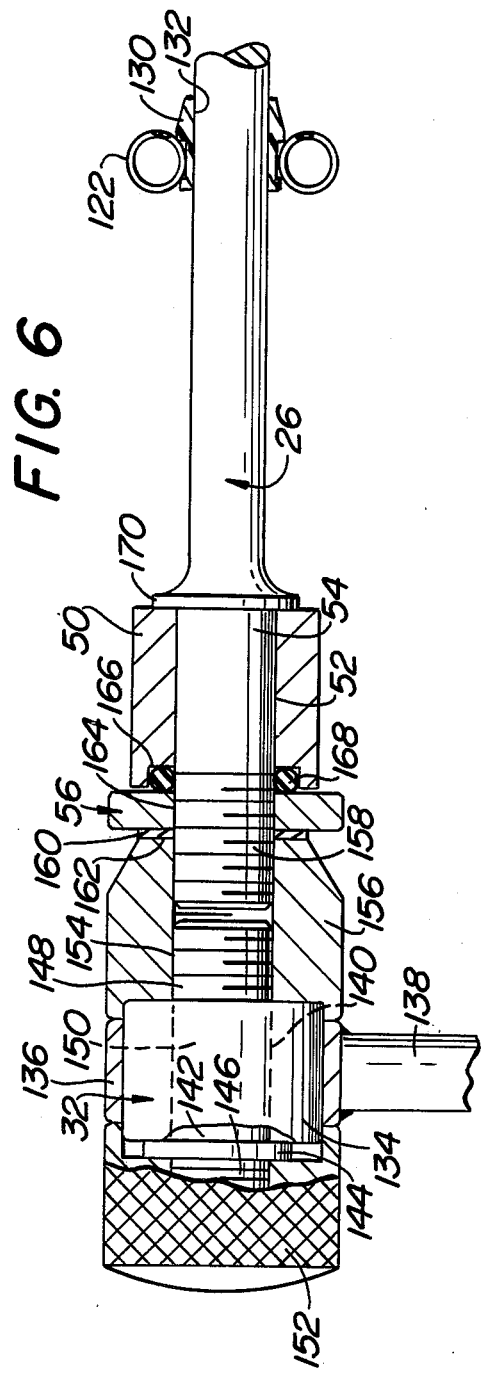
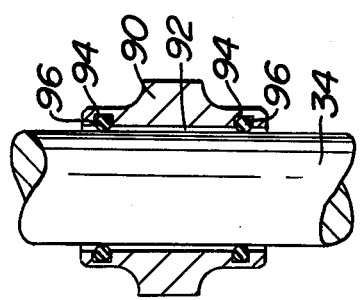

FLY TYING DEVICE

This invention relates generally to holding devices and more particularly to devices for holding fish hooks or other similar objects upon which various materials are tied or fastened to make artificial flies, insects and lures.

Various clamping, support and holding devices for facilitating the tying of flies, insects or lures onto fish hooks have been disclosed in the patent literature e.g., U.S. Pat. No. 2,120,571 (Reichenstein et al), No. 2,166,585 (Evans), No. 2,236,781 (Pannier), No. 2,486,142 (Fong) and No. 3,060,613 (Murray).

While each of said devices may exhibit one or more advantageous features none provide the fly tyer with a device which is readily adjustable for various applications, while enabling full and unrestricted exposure of the hook and ease of manipulation and rotation thereof to facilitate the tying procedure.

Accordingly, there is a general object of the instant invention to provide a holding device which overcomes the disadvantages of the prior art.

It is a further object of the instant invention to provide a device for supporting a hook and for rotating the same about the axis of the shank of the hook to facilitate the tying of a fly thereon.

It is a further object of the instant invention to provide fly tying apparatus which is readily adjustable.

These and other objects of the instant invention are achieved by providing a device for tying fish flies onto the shank of a fishing hook by wrapping a filament about the shank. The device includes a shaft which is rotatable about a first axis and having releasable clamping means mounted thereon at a compound angle to the shaft. The clamping means includes hook engaging jaws which are located immediately adjacent to the axis of the shaft for holding a portion of the hook adjacent to the shank so that the shank is fully exposed and disposed coaxially with the first axis. Means for rotating the shaft about the first axis and for holding the shaft at any rotational position is provided, as is support means for the shaft.

Other objects and many of the attendant advantages of this invention will be readily appreciated as the same becomes better understood by reference to the following detailed description when considered in connection with the accompanying drawings wherein:

FIG. 3 is an enlarged sectional view taken along line 3—3 of FIG. 2;

FIG. 4 is an enlarged sectional view taken along line 4—4 of FIG. 2;

FIG. 5 is an enlarged sectional view taken along line 5—5 of FIG. 1;

FIG. 6 is an enlarged sectional view taken along line 6—6 of FIG. 1;

FIG. 7 is an enlarged sectional view taken along line 7—7 of FIG. 1;

FIG. 8 is an enlarged perspective view of the portion of the apparatus shown in FIG. 1; and FIG. 9 is an enlarged sectional view taken along line 9—9 of FIG. 1.

Figure 1:
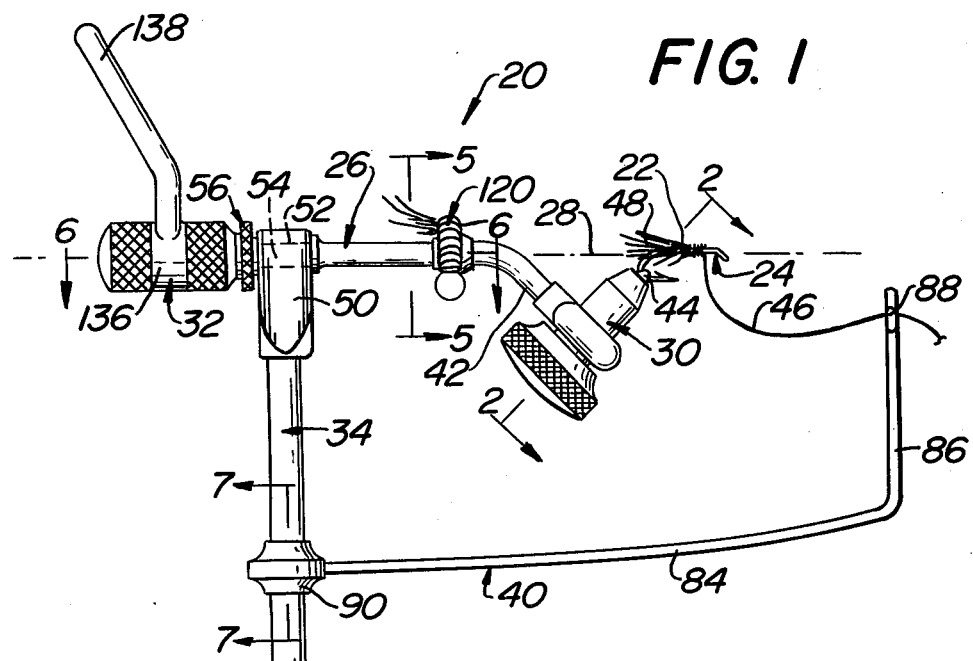
FIG. 1 is a side elevational view of the device of the instant invention shown in the process of tying a fly onto a fish hook.

Referring now to the various figures of the drawing wherein like reference characters refer to like parts there shown in FIG. 1 an improved device 20 for tying a fish fly onto the shank 22 of the conventional fishing hook 24.

The device basically comprises a shaft 26 rotatable about its longitudinal axis, denoted by the reference numeral 28, releasably securable clamping means 30 mounted on the shaft and arranged for clampingly engaging and holding the hook therein, with the axis of the shank 22 of the shaft coaxial with axis 28. The shaft 26 is coupled to one-way clutch means 32 (FIG. 6) for rotating the shaft in one direction about the longitudinal axis 28. The shaft and the clutch means are mounted on an adjustable height beam 34. The beam is supported by a clamp support 36 which is adapted to be secured to the edge of a table 38 or any other support surface. An adjustable height thread cradle 40 is mounted on the beam 34.

As can be seen in FIG. 1, the shaft 26 is an elongated member having one end 42 extending at an obtuse angle to the longitudinal axis 28 of the shaft. The clamping means 30 is mounted at the end of the angularly extending portion 42 and normal thereto so that it extends at a compound angle to the axis 28. The clamping means 30 includes a pair of hook engaging jaws 44. As can be seen the free end of the jaws is disposed laterally immediately adjacent to the axis 28. The compound angle at which the jaws are mounted with respect to the axis and their slight lateral displacement from the axis enables the jaws to clampingly engage the hook 24 at either the curved or barbed portion thereof so that the axis of the shank 22 is coaxial with the axis 28 of the shaft 26. This feature is of considerable importance to provide a non-restricted area about the shank of the hook for greater ease of material positioning and visibility. In addition, the angular position of the jaws plus the slight lateral positioning thereof with respect to the axis permits the device 20 to effect the rotation of the hook about the shank's axis by rotating the clutch means 32. This feature is of considerable importance to enable a thread or filament 46 to be wound around the hook shank 22 to secure feathers, strands or other fly making components 48 to the hook.

As noted earlier the shaft 26 and the clutch 32 are mounted on a beam 34. The beam 34 is an elongated cylindrical rod having a shaft support head 50 mounted at the top end thereof. The shaft support head includes a threaded bore (not shown) into which the threaded upper end (not shown) of the beam 34 is screwed. The shaft support head 50 includes a horizontally extending smooth passageway 52 through which the rear portion 54 of the shaft 26 extends.

As will be described in detail later, friction adjusting means 56 is mounted on the rear end 54 of the rotary shaft 26. The friction adjusting means establishes the amount of drag produced on the rotary shaft as it is rotated by the one-way clutch means 32 about the longitudinal axis 28. The clutch means 32 is arranged, when rotated in one direction to effect the concomitant rotation of shaft 26 about the axis 28. However, when the clutch 32 is rotated in the opposite direction it is disengaged from the rotary shaft 26 such that the shaft remains stationary at its last rotational position. The rotary action provided by the clutch 32 in combination with the angular positioning of the jaws 44, as described heretofore, enables the winding of the filament 46 about the hook's shank 22 to be accomplished in a precise and controllable fashion. This action eliminates the necessity for the user to move his hand holding the filament about the shank of the hook to wind the filament thereon.

In addition, since the clutch only permits rotation of the shank in one direction about axis 28 and since the shank of the hook is coaxial with the axis, the material 46 being wound about the hook shank can be pulled tight without the rotary shaft revolving, which action would enable the material to unwind.

The beam 34 is normally supported in a vertical orientation and is held in that orientation by the clamping base 36. As can be seen, the clamping base 36 is a generally C-shaped member having an upper overhanging section 58 and a lower section 60. A threaded screw 62 extends through a threaded aperture (not shown) in the lower section 60 and terminates in a pressure pad 64. A knurled knob 66 is mounted on the lower end of the screw 62. The rotation of the knob 66 causes the pressure pad to engage the lower surface of table top 38 thereby clamping the base 36 thereto.

As seen clearly in FIG. 1, the upper section 58 of the clamping base includes an opening 68 extending vertically therethrough. The opening is arranged to receive the beam 34 therein. The base 36 also includes a beam locking mechanism 70 comprising a beam locking knob 72 and associated components to be described hereinafter. The beam 34 is arranged to be freely moved up or down through the passageway 68 when the beam lock mechanism 70 is released by loosening its lock knob 72. This feature enables the vertical height of the device to be adjusted and also enables the shaft 26 and the clamping member 30 mounted thereon to be rotated to any position about the axis of the beam 34. The rotational and height adjustability of the device 20 is of considerable importance in the interest of user convenience.

The details of the beam locking mechanism 70 are shown clearly in FIG. 9. As could be seen therein, the locking mechanism 70 includes the beam locking knob 72, identified heretofore, and a grooved locking pin 74. The pin 74 is an elongated rod-like member having an arcuate groove 76 cut in the periphery thereof. The groove is arranged to accommodate a portion of the periphery of the beam 34 therein and is just slightly larger than the peripheral portion of the beam. The pin 74 extends into a bore 78 in the clamp base which communicates with the vertical passageway 68 therein. The rear end of pin 74 is threaded at 80 and received within a threaded bore 82 in the beam locking knob 72.

Operation of the locking mechanism is as follows: when the beam locking knob is rotated to the position wherein pin 74 is located with its groove 76 aligned with the passageway 68 in the base 36, the groove wall of the pin does not engage the periphery of beam 76. Accordingly, the beam 34 can be slid up or down through passageway 68 with ease. Rotation of the knob 72 in either direction from the locking position causes the pin 74 to be displaced with respect to the beam, whereupon its groove portion 76 abuts and intimately engages the contiguous surface of the beam, thereby locking the beam in place in passageway 68.

As noted heretofore, the device 20 includes a cradle 40 for supporting the filament 46 used for tying the fly on the shank of the hook. The cradle 40 includes a horizontally extending arm 84 having an upturned or vertical end section 86, the free end of which forms a hanger 88. The cradle 40 is mounted on the vertical beam 34 via a support 90 and is arranged to be moved to any vertical position thereon. In addition, the cradle can be rotated about the axis of beam 34. The ability to move up and down and to rotate about beam 34 provides the cradle with great flexibility of use for various fly tieing operations.

The cradle support 90 is shown clearly in FIG. 7 and comprises a sleeve having a central passageway 92 through which the beam 34 extends. A pair of annular grooves 94 are provided in the inner periphery of the cradle support 90 adjacent each end of its passageway 92. A respective O-ring 96 is located within each recess 94 to frictionally engage the periphery of the beam 34, thereby holding the beam support in place at any height on the beam and in any rotational position with respect thereto. The horizontally extending portion 84 of the cradle 40 is mounted within an opening (not shown) in the cradle support.

Figure 2:
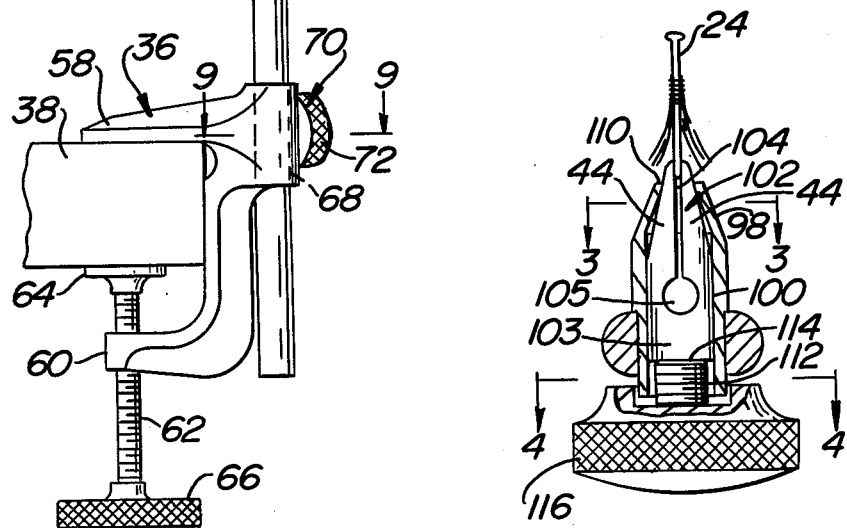
FIG. 2 is an enlarged sectional view taken along line 2—2 of FIG. 1.

In FIGS. 2, 3 and 4 there is shown details of the clamping mechanism 30. Referring now to FIG. 2, it can be seen that the clamping mechanism 30 includes a jaw housing sleeve 98 having a central bore 100 in which the jaws 44 are located. The jaws 44 are formed by a single, unitary C-shaped member 102 having a pair of arms. Each arm serves as a respective jaw of the clamping mechanism. The arms are connected together at the rear 103 of the member 102. A slot 104 extends longitudinally between the jaws 44 to accommodate the hook therein and terminates in an enlarged opening 105 about which the arms 44 flex during the clamping operation.

As can be seen in FIG. 3, the outer periphery of each jaw 44 includes an opposed pair of flatted sides 106 interposed between an arcuate end surface 108. The bore 100 in the housing sleeve 98 is machined internally to match the flatted and arcuate periphery of the jaws and terminates at its free end in an open mouth 110 through which the free end of the jaws extend. The matching of the periphery of the bore 100 and the jaws 44 maintains jaw registration to the longitudinal axis 28 about which the clamping structure is rotated by the rotatable shaft 26.

A jaw actuator screw 112 is disposed within the bore 100 and abuts the end surface 114 of a C-shaped member 102. The other end of the screw 112 is connected, via a threaded hole (not shown), to a knurled clamp actuator knob 116.

As will be appreciated by those skilled in the art, the rotation of knob 116 in a predetermined direction causes the inward displacement of screw 110, thereby forcing member 102 deeper into the housing sleeve 98 to cause the jaws 44 to be flexed together. Such action decreases the size of the slot 104 and clamps any hook portion located therein.

Means are provided on the device 20 for holding materials, e.g., feathers, etc., which are partially fastened to the hook while performing other operations thereon. Such means is a spring clip assembly denoted generally by the reference numeral 120 and including a helical spring 122 (FIG. 5). The spring is bent in an arc and has a pair of ends 124 connected to opposite ends of a spring clip retainer 126. The spring clip retainer is a short rod-like member having a pair of peripheral grooves located at opposed ends thereof and in which the ends 124 of the spring clip are connected. A spring clip guard in the form of a short tubular sleeve 130 is located within the opening provided by the arcuate spring. The tension of the spring holds it on the guard 130. The spring guard 130 includes a central opening 132 through which the rotary shaft 26 extends to mount the spring clip onto the shaft. The spring clip assembly is slideable along the shaft but rotates with the shaft about axis 28.

As can be seen in FIG. 1 interstices between contiguous loops of the spring 122 serve as niches for the receipt of feathers or other components for the flies being tied. Since the spring clip assembly rotates along with the rotary shaft 26 the material held in the clip doesn't become tangled during a tying operation.

The one-way chuck mechanism 32 is shown in detail in FIG. 6. As can be seen therein, the clutch comprises a one-way clutch element 134 permanently secured within a mounting ring 136 to which a handle 138 is secured. The clutch 134 includes a central opening 140 through which a clutch shaft 142 extends. The clutch shaft is an elongated cylindrical member having a flanged intermediate section 144, a threaded rear end 146, a threaded front end 148 and a non-threaded intermediate portion 150. The intermediate portion 150 extends through the passageway 140 in the clutch 134.

The clutch 134 is constructed so that when it is rotated about the longitudinal axis of the clutch shaft 142 in one rotational direction, it grasps the clutch shaft to carry the shaft with it, yet when rotated in the opposite direction the clutch shaft is freed to remain stationary. One particularly effective one-way clutch is sold by Torrington Needle Bearing and is identified as its part No. RC-061006. That clutch comprises a plurality of cylindrical rollers (not shown) disposed equidistantly about the clutch's passageway 140. The axis of rotation of each of the cylindrical rollers is parallel to the axis of the passageway, with each roller being enabled to rotate about its axis in one direction but not in the other.

As can be seen in FIG. 6 the threaded rear end 146 of the clutch shaft is disposed within a clutch shaft cap 152. The threaded front end 148 of the clutch shaft is threadly engaged in a threaded bore 154 of a friction locking knob 156.

As shown in FIG. 6, the rear end of the rotary shaft 26, that is a portion disposed beyond cylindrical portion 54, is threaded at 158. The threaded end 158 of the shaft 26 is threadly engaged in the threaded bore 154 of the friction locking knob 156 to effect the connection between the clutch shaft 142 and the rotary shaft 26. A flat friction adjusting washer 160 is interposed between the friction adjusting ring 56 and the front end 162 of the friction locking knob 156. The friction adjusting ring is a disk-like member having a threaded central opening 164 through which the rear threaded end 158 of the rotary shaft 26 extends. By rotation of the ring 56 the longitudinal positioning of the ring along the shaft can be adjusted as desired.

The shaft support 50 includes an annular recess 166 in the rear face thereof and extending about the periphery of the passageway 52 extending therethrough. A resilient material, e.g., rubber, O-ring 168 is located within the recess 166. The intermediate portion of the shaft 26 includes a flanged stop 170 which abuts the front surface of the shaft support 50 at portions contiguous with the opening 52 therein.

As will be appreciated by those skilled in the art by rotating the friction adjusting ring 56 such that it moves towards the shaft support 50, the O-ring makes greater frictional contact therewith. This action produces more drag on the rotary shaft 26 during its rotation by the clutch mechanism 32. Conversely, rotation of the friction adjusting means to move it away from the shaft support 50 results in decreasing the drag on the rotary shaft 26.

As should be appreciated from the foregoing, the device of the instant invention is relatively simple in construction, can be assembled and disassembled quickly and easily and is arranged for facilitating the tying of flies, lures, etc., onto fishing hooks quickly and easily and without requiring extensive hand manipulation by the user.

It should also be pointed out at this juncture that while the device of the instant invention has particular applicability for tying of flies and the like onto fish hooks, the device has utility for other applications requiring readily adjustable and positionable clamping and holding means, such as for use in model making, etc.

Without further elaboration the foregoing will so fully illustrate my invention that others may, by applying current or future knowledge, readily adapt the same for use under various conditions of service.

What is claimed as the invention is:

1. A device for tying fish flies onto the shank of a fishing hook by wrapping a filament about said shank comprising, shaft means rotatable about a first axis, releasable securing clamping means mounted on said shaft at a compound angle thereto and having hook engaging means located immediately adjacent to said axis, said hook engaging means holding a portion of said hook adjacent to said shank so that said shank is fully exposed and disposed coaxially with said first axis, one-way clutch means for rotating said shaft about said first axis and for holding said shaft at any rotational position and support means for said shaft, said one-way clutch means being rotatable about said first axis in one direction, whereupon said shaft rotates therewith, and being rotatable in the opposite direction, whereupon the shaft does not rotate.

2. The device of claim 1 wherein said one-way clutch means comprises handle means to effect the rotation of said clutch means.

3. The apparatus of claim 1, wherein said hook engaging means comprises a releasably securable pair of jaws.

4. The device of claim 3 wherein said support means comprises a beam on which said shaft and said clutch means are mounted, a base and releasable locking means, said base being mountable on a support surface, the position of said beam with respect to said base being adjustable to adjust the height said shaft is disposed over said base.

5. The apparatus of claim 4 wherein said base comprises means for securement to said support surface.

6. The apparatus of claim 5 comprising filament holding and guide means.

7. The apparatus of claim 6 wherein said filament holding and guide means is mounted on said beam for longitudinal and rotational adjustment with respect thereto.

8. The apparatus of claim 7 additionally comprising spring clip means mounted on said shaft for holding fly tying material thereon.

* * * * *